(12) United States Patent
Kunze

(10) Patent No.: US 8,734,704 B2
(45) Date of Patent: May 27, 2014

(54) METHOD OF FABRICATING AN IMPROVED MOLD CORE AND A MOLD CORE OBTAINED BY SAID METHOD

(75) Inventor: Steffen Kunze, Vagen (DE)

(73) Assignee: Airbus Helicopters Deutschland GmbH, Donawoerth (DE)

( * ) Notice: Subject to any disclaimer, the term of this patent is extended or adjusted under 35 U.S.C. 154(b) by 0 days.

(21) Appl. No.: 12/968,982

(22) Filed: Dec. 15, 2010

(65) Prior Publication Data
US 2011/0147564 A1 Jun. 23, 2011

(30) Foreign Application Priority Data
Dec. 17, 2009 (EP) .................................. 09400064

(51) Int. Cl.
*B29C 33/76* (2006.01)
*B29C 33/40* (2006.01)
*B28B 7/34* (2006.01)
*B28B 7/30* (2006.01)

(52) U.S. Cl.
USPC ........... 264/317; 264/219; 264/220; 264/221; 264/225; 264/226; 264/313; 264/334; 264/DIG. 44

(58) Field of Classification Search
USPC ........ 264/41, 42, 45.1, 45.3, 45.4, 46.4, 46.6, 264/219, 220, 221, 225, 226, 313, 317, 334, 264/DIG. 44; 249/61, 112, 178
See application file for complete search history.

(56) References Cited

U.S. PATENT DOCUMENTS

| | | | | |
|---|---|---|---|---|
| 4,087,502 A | * | 5/1978 | Hoffmeister | 264/46.4 |
| 4,840,219 A | * | 6/1989 | Foreman | 164/369 |
| 5,397,643 A | * | 3/1995 | von Bonin et al. | 428/408 |
| 5,492,660 A | * | 2/1996 | Vyletel et al. | 264/86 |
| 5,846,357 A | | 12/1998 | Meteer et al. | |
| 6,325,958 B1 | * | 12/2001 | Lombardi et al. | 264/86 |
| 6,828,373 B2 | * | 12/2004 | Artz et al. | 524/492 |
| 2005/0116136 A1 | * | 6/2005 | Artz et al. | 249/63 |
| 2006/0071364 A1 | * | 4/2006 | Zenpo et al. | 264/219 |
| 2009/0127730 A1 | * | 5/2009 | Zenpo et al. | 264/28 |
| 2009/0233053 A1 | | 9/2009 | Gans et al. | |

FOREIGN PATENT DOCUMENTS

| | | |
|---|---|---|
| DE | 2061996 A1 | 6/1971 |
| DE | 19534836 A1 * | 3/1997 |
| DE | 10342867 A1 | 4/2005 |
| DE | 102004009744 A1 | 9/2005 |

(Continued)

OTHER PUBLICATIONS

European Search Report and Written Opinion, Application No. EP 09400064, dated May 20, 2010.

(Continued)

*Primary Examiner* — Atul P. Khare
(74) *Attorney, Agent, or Firm* — Brooks Kushman P.C.

(57) ABSTRACT

The present invention relates to a method of fabricating a mold core (5) for making hollow parts (11) based on a composite material including fibers, fabrics, or textiles together with a resin, the method consisting in mixing a filler material (1) and a binder material (2) in order to obtain a uniform mixture of materials, and in solidifying, compacting, and shaping the resulting mixture in order to constitute said core, the method being characterized in that it further consists in introducing into the mixture at least one complementary material (3) that is expandable under the effect of heat or by applying another physical or chemical principle, and in mixing said materials (1, 2, 3) in order to obtain a uniform distribution of the complementary material (3) in the mixture.

9 Claims, 1 Drawing Sheet

(56) References Cited

FOREIGN PATENT DOCUMENTS

| | | |
|---|---|---|
| DE | 102005011488 A1 | 9/2006 |
| DE | 102005011930 B3 | 9/2006 |
| EP | 1695805 A1 | 8/2006 |
| EP | 1745908 A1 | 1/2007 |
| GB | 2259667 A * | 3/1993 |

OTHER PUBLICATIONS

Chinese Office Action Dated Oct. 17, 2013, Application No. 201010604130.8, Applicant Eurocopter Deutschland GmbH, 5 Pages.

* cited by examiner

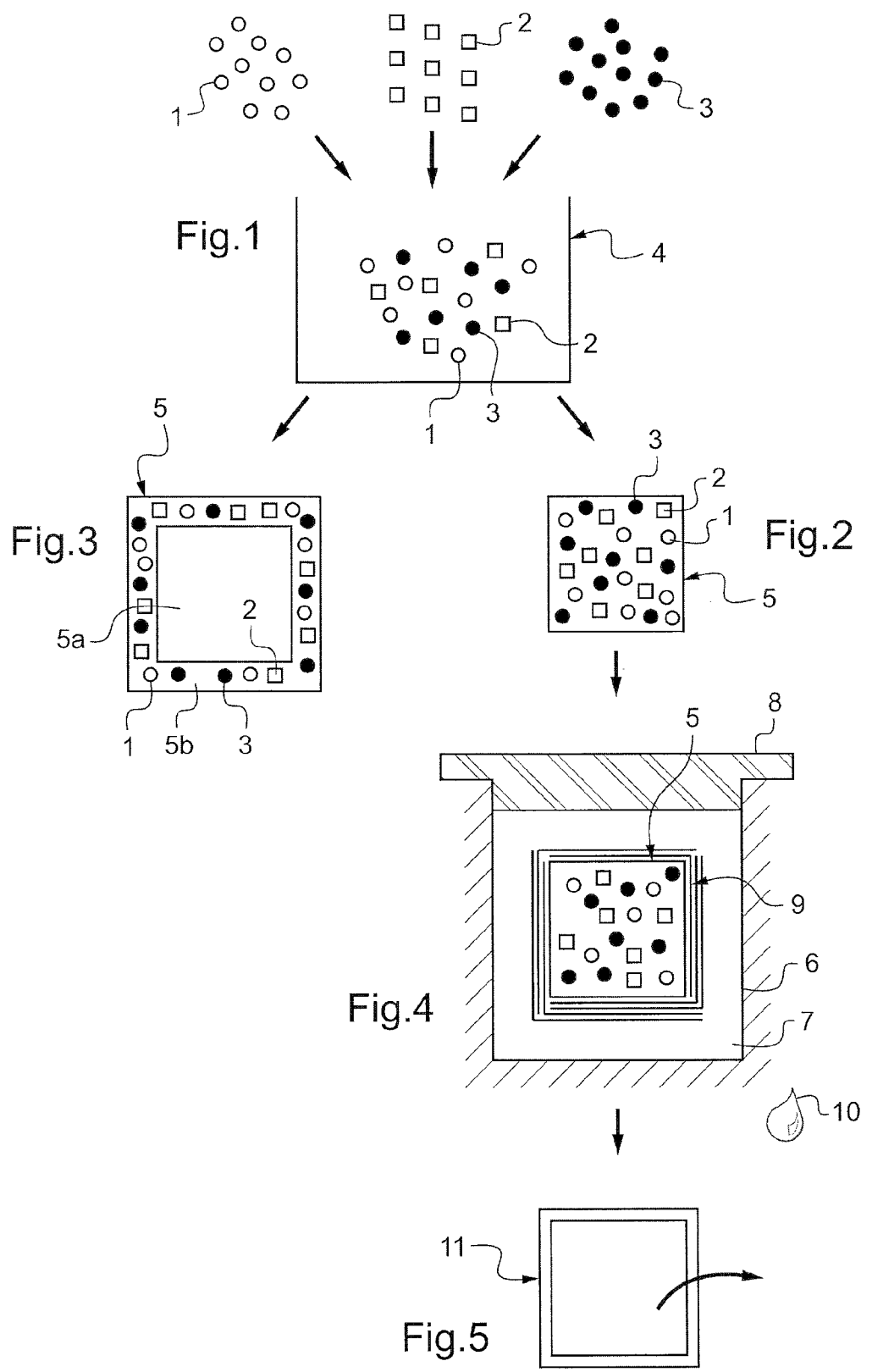

METHOD OF FABRICATING AN IMPROVED MOLD CORE AND A MOLD CORE OBTAINED BY SAID METHOD

CROSS REFERENCE TO RELATED APPLICATION

This application claims the benefit of European Application No. EP 09 400064.3, filed Dec. 17, 2009, the disclosure of which is incorporated herein by reference.

FIELD OF THE INVENTION

The present invention relates to the general technical field of fabricating hollow one-piece parts based on metallic or organic materials, e.g. including reinforcement based on fibers and resin. By way of example these parts are obtained by molding a composite material, e.g. reinforced with fibers. The invention relates also to injection molded parts.

The present invention relates to hollow parts of shapes that present projecting portions such as raised portions, enlargements, shoulders, etc., which are often difficult or even impossible to separate from their mold cores.

The present invention thus relates more particularly to fabricating such mold cores.

BACKGROUND OF THE INVENTION

In order to counter problems of that kind, it is therefore known, during molding operations, to make use of cores that are soluble in water for some other liquid. In order to obtain sufficient solubility together with low density, the materials from which these mold cores are made are generally open-celled materials of the Aquacore™ kind (e.g. U.S. Pat. No. 6,828,373, EP 1745908 or EP 1695805). Such mold cores that are soluble in a liquid are themselves known.

Mold cores made in this way need to be sealed with a suitable material to prevent the material for constituting the future part that is to be molded, such as a resin or a metal in molten form from infiltrating into said cores. By way of example, sealing materials are described for example in documents DE 10 2005 011 930, DE 10 2005 011 488 or DE 10 2004 009 744.

The sealing material also makes it possible to ensure that the material constituting the parts obtained by molding, or portions of said parts, not contaminated by a material constituting the mold core.

The major drawback of mold cores of that kind is that, when fabricating them, it is necessary to have recourse to two groups of distinct materials, one for fabricating the cores and the other for sealing said cores. Those distinct materials are used during successive and different stages during the fabrication of sealed mold cores. That increases the number of materials to be managed and used, and also the number of fabrication steps of producing sealed mold cores. That inevitably leads to higher fabrication costs for such mold cores.

Another drawback is that the known sealing build-up (for instance one single layer upon the core) is very susceptible to damage. When damaged, the core can be infiltrated and the part to be built most likely a waste part.

Additionally, in many cases of sealing techniques, the sealing of complex shapes of cores cannot be achieved e.g. when using plastic films for sealing.

SUMMARY OF THE INVENTION

Consequently, an object of the present invention is to propose a novel method of fabricating mold cores that does not present the above-mentioned drawbacks and that is particularly simple to implement.

Another object of the present invention is to propose a novel method of fabricating mold cores that is firstly technically simple to implement and that is secondly less expensive in terms of time and money.

Another object of the present invention is to provide a novel mold core presenting novel properties and abilities.

The objects given to the invention are achieved with the help of a method of fabricating a mold core for making hollow parts or parts with undercuts, based on a composite material including fibers, fabrics, or textiles together with a resin, the method consisting in mixing a filler material and a binder material in order to obtain a uniform mixture of materials, and in solidifying, compacting, and shaping the resulting mixture in order to constitute said core, the method being characterized in that it further consists in introducing into the mixture at least one complementary material that is expandable under the effect of heat or by applying another physical or chemical principle (e.g. a foaming operation), and in mixing said materials in order to obtain at least a local distribution of the complementary material in the mixture.

In an implementation in accordance with the invention, the method consists in mixing said materials in such a way to obtain uniform distribution of the complementary material in the mixture.

In an implementation in accordance with the invention, the method consists in using materials in powder or granular form The filler material is for example a mold base material with a grain size lying between 10 μm and 2 mm.

In an implementation in accordance with the invention, the method consists in using a determined quantity of complementary material so that in the mixture, the percentage by weight of said complementary material lies in the range 0.01% to 99.99% of the total combined weight of the materials.

In an implementation in accordance with the invention, the method consists in determining the quantity of complementary material for mixing with the filler material and with the binder material as a function of the volume expansion percentage desired for the core, for a given temperature difference in a certain temperature range.

Such an expansion allows to compensate the de-bulking movement of the semi-finished products (e.g. prepreg or dry preform) of the part to be produced during molding, or any thermal expansion movement of outer mold tooling. In addition, the expansion can be used to exert additional pressure on the part to be produced to compensate any hydrostatic pressure within the part or to allow compensation, for additional compaction.

Depending on the selected materials, the expansion could be non-linear over a certain temperature range and could consist of more than one distinct expansion steps.

In the fabrication of a mold core, an advantage of the method in accordance with the invention lies in eliminating one or more steps relating to sealing said core.

By way of example, the method according to the invention presents the advantage that the fabricated mold core exhibits self-sealing and/or self-healing properties.

The objects given to the invention are also achieved with the help of a mold core or a mold core part comprising a mixture of a filler material and of a binder material, and being characterized in that it includes a complementary material that is expandable under the effect of heat or any other physical principle and that is distributed at least locally within the mixture comprising the filler material and the binder material.

In an embodiment in accordance with the invention, the complementary material is uniformly distributed within the mixture.

In an embodiment in accordance with the invention, the percentage by weight of said complementary material lies in the range 0.01% to 99.99% of the total combined weight of the materials constituting said core or said core part.

In an embodiment in accordance with the invention, at least one of its component materials is soluble in a liquid e.g. water.

In an embodiment in accordance with the invention, the core comprises an insoluble kernel at least partly surrounded by a peripheral portion that is removable or soluble in a liquid, the complementary material being incorporated in said peripheral portion.

In an embodiment in accordance with the invention, the core comprises a kernel at least partly surrounded by a peripheral portion, the complementary material being incorporated in said peripheral portion.

In an embodiment in accordance with the invention, the complementary material comprises metallic particles (e.g. aluminum powder), silicone, graphite, thermoplastic solids, or gas- or liquid-filled thermoplastics or any other gas- or liquid-filled particles.

The objects given to the invention are also achieved with the help of a molding device including a mold core as described above.

An advantage of an embodiment of the mold core in accordance with the invention lies in its self-sealing properties against the intrusion of any thermoset or thermoplastic resin into the core.

In addition this behavior could contribute to self-healing properties associated with said core being sealed automatically by the expansion of the complementary material.

Thus, any defects that appear on the core, e.g. as a result of poor handling, can be compensated or rectified by the intrinsic expansion and packing properties presented by the complementary material, and consequently by the core. Scratches for instance are closed by the expansion.

However, in another embodiment of the mold core in accordance with the invention, an advantage lies in the fact that the said mold core can be associated to an additional outer sealing of any kind.

Another advantage of the mold core in accordance with the invention is that complex shapes can be built with a high level of precision.

Another advantage of the mold core in accordance with the invention is that no "edge effects" are expected. These "edge effects" are common for additionally sealed cores.

Another advantage of the mold core in accordance with the invention lies in the possibility of selecting a complementary material that confers anti-adhesive properties to said core. The unmolding operation is consequently made easier, and the core may be recovered in some cases without being deteriorated.

Another advantage of the mold core in accordance with the invention lies in the possibility of selecting complementary material particles that expands sufficiently to destroy the molecular bonds between the material of the binder and the other materials within said core. The need for a liquid soluble binder could be eliminated as the expansion of the particles could destroy the existing binder bridges, making the detached particles easy to trickle out of the composite part.

BRIEF DESCRIPTION OF THE DRAWINGS

The invention and its advantages appear in greater detail from the following description of an embodiment given by way of illustration and with reference to the accompanying figures, in which:

FIG. 1 illustrates an example of implementing the method in accordance with the invention in order to obtain a mold core in accordance with the invention;

FIG. 2 illustrates an embodiment of a mold core in accordance with the invention;

FIG. 3 illustrates another embodiment of a mold core in accordance with the invention; and FIGS. 4 and 5 are diagrams illustrating an operation of molding a part with the help of a mold core in accordance with the invention.

DETAILED DESCRIPTION OF THE PREFERRED EMBODIMENT

Elements that are structurally and functionally identical, and that are present in more than one distinct figure or illustration, are given the same numeric or alphanumeric reference in each of them.

The fabrication method in accordance with the invention and that is illustrated by FIG. 1 consists in using a filler material 1, a binder material 2, and a complementary material 3. These materials are inserted into a known mixer device 4 in order to be mixed together.

The resulting mixture then contains a uniform distribution of the filler material 1, the binder material 2, and the complementary material 3.

The complementary material is a material that expands under the effect of heat, or any other physical principle such as U.V. light radiations, ultrasonic waves etc.

Advantageously, the complementary material presents an expansion equal or higher than that of the outer mold tooling of the part to be produced.

The advantageously uniform mixture as obtained in this way is subsequently compacted and shaped to the form of a mold core 5. An embodiment of a mold core 5 in accordance with the invention is shown in FIG. 2.

The shaping step can also include the use of heat and/or exposition to a gas.

Another embodiment of a mold core 5 in accordance with the invention is shown in FIG. 3. This embodiment shows a mold core 5 comprising a kernel 5a and a peripheral portion 5b.

By way of example, and the kernel 5a is insoluble, while the peripheral portion is soluble in a liquid.

In order to ensure that at least a portion of the mold core is soluble, at least one of its component materials 1, 2, 3 is removable by or soluble in a liquid or removable by any other physical principle such as ultrasonic excitation.

Advantageously, the kernel 5a can be reused to fabricate another mold core, after the peripheral portion 5b has been dissolved.

FIG. 4 is a highly diagrammatic view of a molding device including a body 6 defining a mold chamber 7.

The mold chamber 7 is closed with the help of a cover 8 having an inner edge that fits therein after the mold core 5 has been put into place. The core is advantageously covered in reinforcing layers 9 based on resin-impregnated fibers.

By way of example, these reinforcing layers are made using a pre-impregnated semi-finished material or a prepreg, or with any other material that needs to be subjected to a given temperature and/or a given pressure in order to solidify.

During such a molding operation, the expansion of the complementary material 3 in the mold core 5 serves to generate internal pressure within said mold core 5 that is sufficient to guarantee the necessary compacting and good shaping of the assembly constituted by the reinforcing layers 9.

For a given molding temperature, it is thus possible to determine the pressure that exists inside of the mold core 5 by initially selecting the concentration of the expandable complementary material 3 within said mold core 5.

After the molding operation, and in conventional manner, a liquid 10 is introduced into the inside of a hollow part 11, shown in FIG. 5, which part is obtained by compacting and solidifying the reinforcing layers 9, in order to dissolve the mold core 5. Consequently, fabrication of the hollow part 11 does not encounter any problems of unmolding or any problems of contamination or migration of materials.

Naturally, the present invention can be subjected to numerous variations as to its implementation. Although several embodiments and implementations are described above, it should readily be understood that it is not conceivable to identify exhaustively all possible variants. It is naturally possible to envisage replacing any of the means described or any of the steps described with equivalent means or an equivalent step without going beyond the ambit of the present invention.

The invention claimed is:

1. A method of fabricating a mold core for making a composite part which is hollow or has undercuts and which is based on a composite material including fibers, fabrics, or textiles together with a resin, the method comprising mixing a filler material having a grain size between 10 μm and 2 mm with a binder material and at least one complementary material comprising expandable graphite particles in order to obtain a uniform mixture, the expandable graphite particles being expandable under the effect of heat, wherein at least one of the filler material and the binder material is liquid soluble; and solidifying, compacting, and shaping the uniform mixture to at least partly surround an insoluble kernel in order to constitute said core, wherein the mixture comprises an amount of said graphite particles determined as a function of a desired volume expansion percentage of said mold core for a given temperature difference in a certain temperature range, wherein said amount lies between 0.01% to 99.99% of the total combined weight of the uniform mixture, and wherein said mold core expands while making said composite part so as to exhibit self-sealing and self-healing properties.

2. The method according to claim 1, wherein the filler, binder, and complementary materials are in powder or granular form.

3. The method according to claim 1, wherein at least one of the filler material and the binder material is water soluble.

4. The method according to claim 1, wherein said grain size is between 201 μm and 2 mm, and wherein said amount of the expandable graphite particles lies between 20% to 99.99% of the total combined weight of the uniform mixture.

5. A method of making a hollow composite part based on a composite material including fibers, fabrics, or textiles together with a resin, the method comprising mixing a filler material having a grain size between 10 μm and 2 mm with a binder material and expandable graphite particles in order to obtain a uniform mixture, the expandable graphite particles being expandable under the effect of heat, wherein at least one of the filler material and the binder material is liquid soluble; solidifying, compacting, and shaping the mixture to at least partly surround an insoluble kernel in order to form a mold core; molding said composite material around the core; and exposing the core to a liquid which dissolves at least a portion thereof in order to form said hollow part, wherein the mixture comprises an amount of said graphite particles determined as a function of a desired volume expansion percentage of said mold core for a given temperature difference in a certain temperature range, and wherein said mold core expands during said molding so as to exhibit self-sealing and self-healing properties.

6. A method of fabricating a mold core for making a hollow composite part based on a composite material including fibers, fabrics, or textiles together with a resin, the method comprising:
    mixing a filler material having a grain size between 10 μm and 2 mm with a binder material and expandable graphite particles in order to obtain a uniform mixture; and
    shaping and solidifying the uniform mixture to at least partly surround an insoluble kernel in order to form said mold core, the expandable graphite particles being expandable under the effect of heat, and at least one of the filler material and the binder material being liquid soluble so that said composite material can be molded about the mold core with at least a portion of the mold core subsequently being removed via exposure thereof to said liquid in order to form said hollow part,
    wherein the mixture comprises an amount of said graphite particles determined as a function of a desired volume expansion percentage of said mold core for a given temperature difference in a certain temperature range,
    wherein said amount lies between 0.01% to 99.99% of the total combined weight of the uniform mixture, and
    wherein said mold core expands while making said composite part so as to exhibit self-sealing and self-healing properties.

7. The method according to claim 6, wherein at least one of the filler material and the binder material is water soluble.

8. The method according to claim 6, wherein said grain size is between 201 μm and 2 mm, and wherein said amount of the expandable graphite particles lies between 20% to 99.99% of the total combined weight of the uniform mixture.

9. The method according to claim 6, wherein said volume expansion allows for a compensation of any de-bulking movement of the composite material or any thermal expansion movement of outer mold tooling during molding, and wherein said volume expansion exerts pressure on the composite material to compensate for hydrostatic pressure within the part or for additional compaction thereof during molding.

* * * * *